INVENTOR.
AMOS E. HAWKINS,
BY
McMorrow, Berman + Davidson
ATTORNEYS.

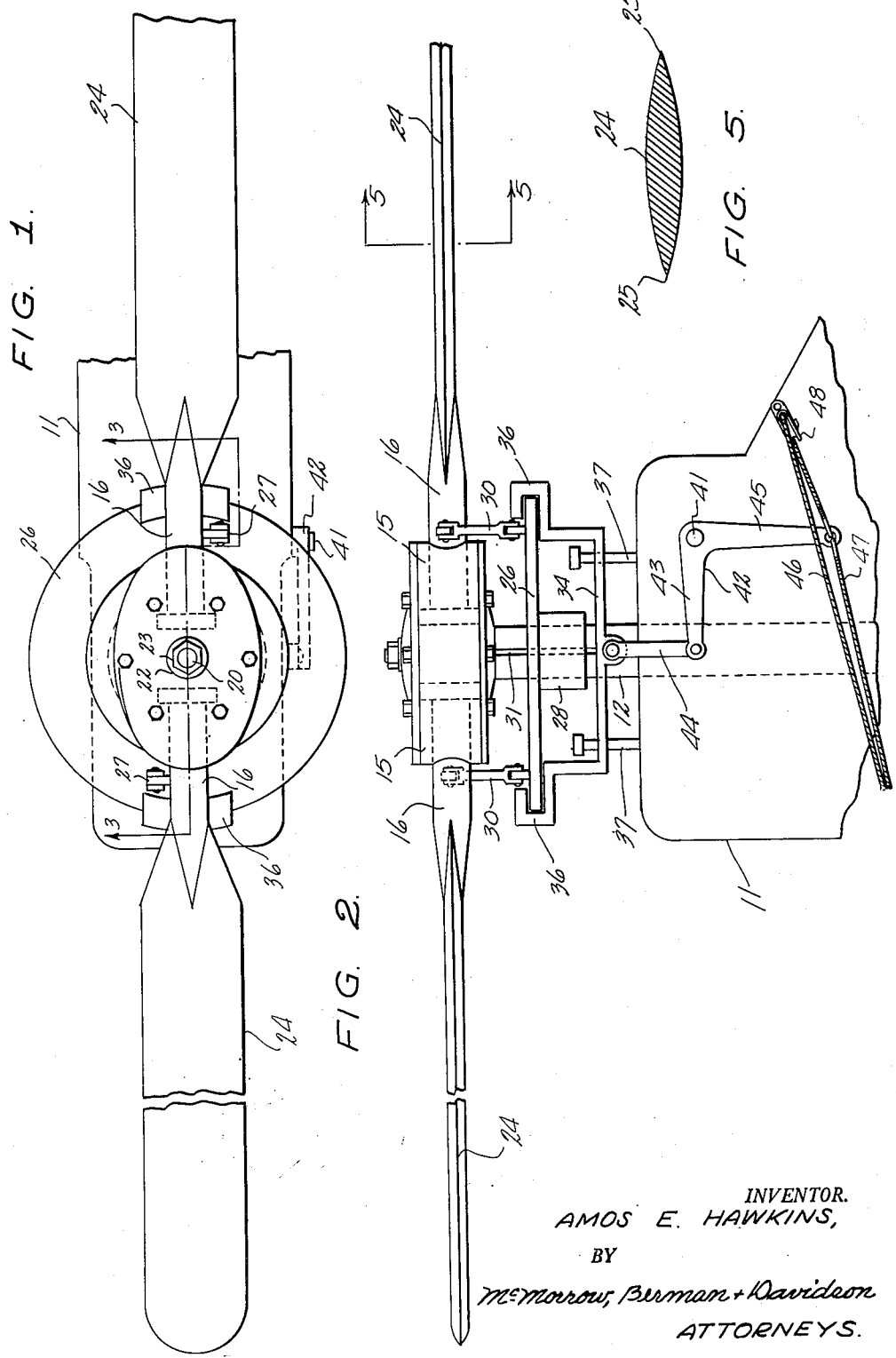

Patented Oct. 14, 1952

2,613,752

UNITED STATES PATENT OFFICE 2,613,752

ADJUSTABLE PITCH PROPELLER FOR AIRCRAFT

Amos E. Hawkins, Haysi, Va.

Application January 12, 1951, Serial No. 205,728

1 Claim. (Cl. 170—160.46)

This invention relates to variable pitch propellers for aircraft, and more particularly to a variable pitch assembly for the torque-compensating propeller of a helicopter.

A main object of the invention is to provide a novel and improved variable pitch assembly for aircraft propellers, said assembly being simple in construction, being dependable in operation, and involving relatively few parts.

A further object of the invention is to provide an improved variable pitch propeller assembly for aircraft which is especially useful in connection with the torque-compensating propellers of a helicopter, providing a convenient and efficient means of varying the pitch of the torque-compensating propellers and thereby varying the direction of travel of the helicopter.

Further objects and advantages of the invention will become apparent from the following description and claim, and from the accompanying drawings, wherein:

Figure 1 is a front elevational view of an improved variable pitch propeller assembly constructed in accordance with the present invention;

Figure 2 is a top view of the propeller assembly of Figure 1;

Figure 5 is an enlarged, cross-sectional, detail view taken on line 5—5 of Figure 2, showing the cross-sectional shape of one of the propeller blades employed in the variable pitch propeller assembly of the present invention.

Figure 3:
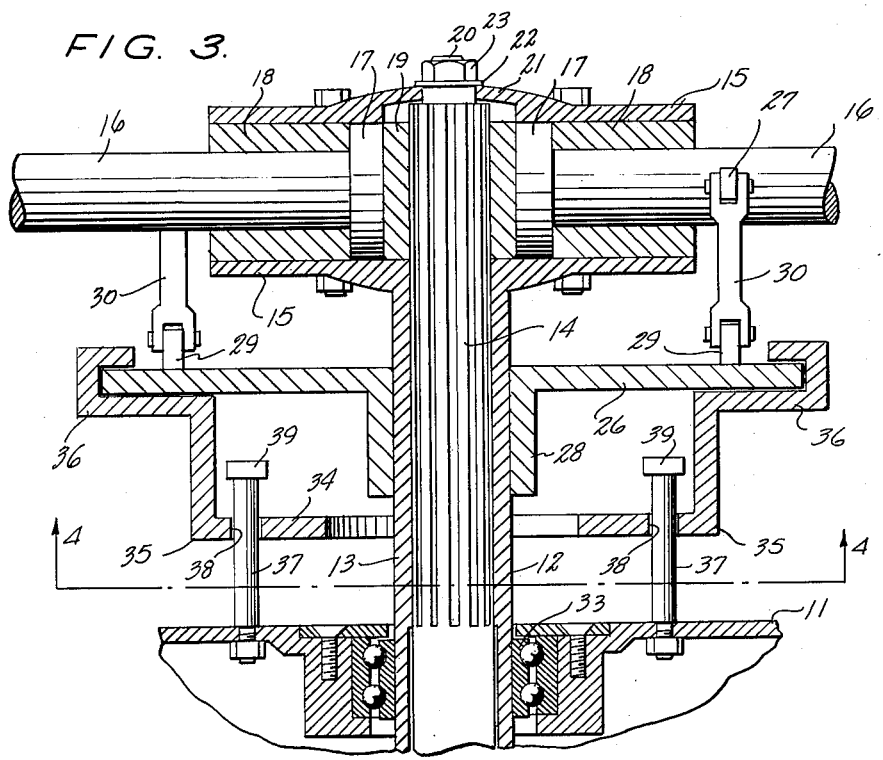
Figure 3 is an enlarged, cross-sectional view taken on line 3—3 of Figure 1.
Figure 4:
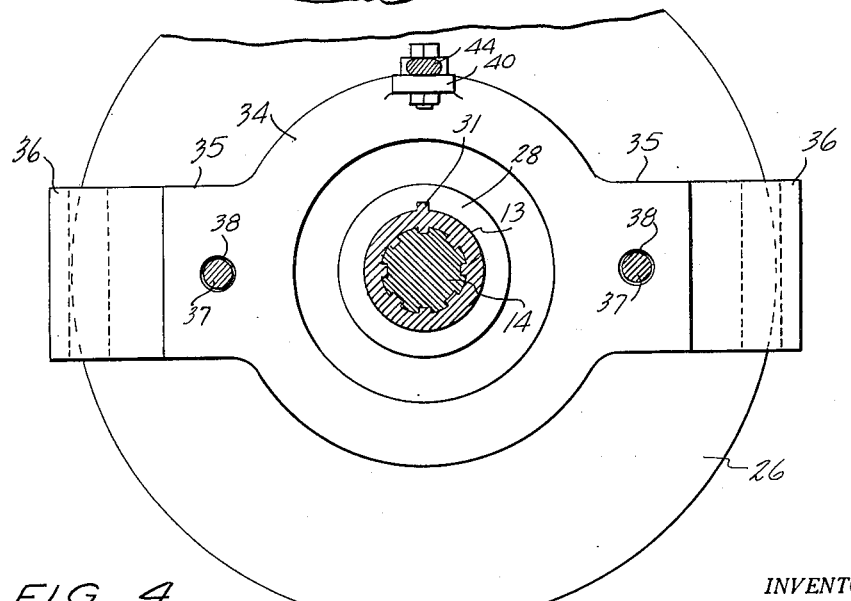
Figure 4 is a cross-sectional view taken on line 4—4 of Figure 3.

Referring to the drawings, 11 designates the rear end portion of a fuselage of a conventional aircraft, such as a helicopter, and 12 designates the driving shaft of the torque-compensating propeller mechanism of the aircraft. The shaft 12 comprises an outer sleeve portion 13 in which is splined the inner shaft element 14, as shown in Figures 3 and 4, whereby sleeve 13 is rigidly secured to shaft element 14. Transversely secured to one end of the shaft 12 is a housing 15, in which are diametrically opposed, radially extending propeller blade shafts 16, 16. Each shaft element 16 is provided at its inner end with a circular head portion 17 which is rotatable in its associated sleeve 15 and which is restrained against outward movement by respective bearing elements 18 and 19, as shown in Figure 3. The bearing element 19 may comprise a sleeve splined on the inner shaft portion 14, and the bearing elements 18, 18 may comprise respective bushings secured inside the sleeve members 15, 15 in the position shown in Figure 3, and restraining the head members 17, 17 against outward movement in the sleeve members 15, 15.

As shown in Figure 3, the splined end portion of the shaft member 14 is provided with an axially extending threaded stud 20 which extends through the intermediate portion 21 of the transverse member defining the sleeves 15, 15, a washer 22 being mounted on the stud and a nut 23 being threaded on said stud to secure the sleeve portion 13 of shaft 12 against separation from the shaft portion 14.

As shown in Figures 1, 2 and 5, each propeller blade includes the shaft portion 16 and the blade body 24, said body tapering at its side edges, as shown at 25, 25, and being of maximum thickness at its intermediate portion. Rigidly secured to each shaft element 16 is an outwardly projecting lug 27, the lug 27 extending outwardly in the same plane as the blade portion 24, but projecting on opposite sides of the respective shaft elements 16, 16, as shown in Figure 1. Designated at 26 is a disc member which surrounds the propeller shaft 12 and which is provided with a sleeve portion 28 slidably engaged on said shaft 12. Projecting from the disc 26 are the diametrically opposed lugs 29, 29. The respective lugs 29, 29 are connected to the respective lugs 27, 27 by the link bars 30, 30. It will be apparent that movement of disc member 26 along the shaft 12 causes rotation of respective propeller blade shafts 16, 16 in opposite directions.

As shown in Figure 4, the shaft 12 is keyed to the sleeve element 28 by the provision of a longitudinally extending key rib 31 on the outer surface of the sleeve member 13 which is slidably received in a longitudinal keyway formed inside the sleeve element 28. It will therefore be apparent that the disc member 26 rotates along with the shaft 12 and the propeller blades 24, 24. As shown in Figure 3, the shaft 12 is journaled in the fuselage 11 by the provision of a conventional ball bearing unit shown at 33. Designated at 34 is a ring which surrounds the shaft 12 and which is formed with the diametrically opposed arms 35, 35. Each arm 35 is formed at its end with the offset hooked portion 36 which engages loosely around the periphery of the disc member 26, being formed to allow the disc member 26 to rotate freely therein. The ring 34, taken with the arms 35, 35 and the hook portions 36, 36 at the ends of said arms, therefore define a yoke engaged on the disc member 26, said disc member being freely rotatable in said yoke. However, the disc member 26 is movable along the shaft 12 in response to movements of the ring 34 along said shaft. Designated at 37, 37 are respective guide bolts secured to the fuselage 11 at points diametrically opposite with respect to shaft 12 and extending through the respective arms 35, 35 by the provision of apertures 38, 38 in said arms in which the bolt members 37, 37 are respectively slidably receivable, as shown in Figure 3. The bolts 37 are provided with heads 39 which serve as stop elements to limit movement of the ring 34 outwardly along the shaft 12. The periphery of the ring 34 is formed at a location midway between the arms 35, 35, with an apertured lug 40. Pivoted at 41 to the fuselage 11 is a bent lever 42. The end of one of the arms 43 of lever 42 is connected by a link 44 to the apertured lug 40. The end of the other arm 45 of said lever is connected to the respective control cables 46, 47 in the manner shown in Figure 2. As shown in Figure 2, the cable 46 passes over a pulley 48 secured to the fuselage 11, and the cables 46, 47 are connected in a conventional manner to a control lever mounted in the operator's compartment of the aircraft, which may be suitably manipulated to rotate bent lever 42 either clockwise or counterclockwise, as viewed in Figure 2, as desired. When the lever 42 is rotated clockwise from the position shown in Figure 2, the disc 26 is moved upwardly, as viewed in Figure 2, causing the blades 24, 24 to rotate in one direction, and when the lever 42 is rotated counterclockwise, the disc 26 is moved downwardly, as viewed in Figure 2, causing the blades 24, 24 to be rotated in the opposite direction. It will be apparent that the blades 24, 24 may be rotated in any desired degree and may be reversed, if desired, by the operation of the cables 46, 47 and the bent lever 42. Therefore, when installed in an aircraft, such as a helicopter, to control the pitch of the torque-compensating propeller blades of the helicopter, the apparatus above described may be utilized as a means of varying the direction of the aircraft, and hence may form a part of the steering means of the aircraft. It will be further apparent that the apparatus above described and illustrated in the drawings may also be employed in any aircraft using a variable pitch propeller assembly.

While a specific embodiment of a variable pitch mechanism for aircraft propellers has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an aircraft, a fuselage, an upstanding propeller shaft journaled in said fuselage, a housing transversely secured to the end of said shaft, a pair of propeller blades rotatably secured to said housing in diametrically opposed radially extending positions relative to said shaft, the blades being rotatable around their respective longitudinal axes, a disc member surrounding said propeller shaft and mounted on the latter shaft for sliding non-rotative movement therealong, a lateral projection on each blade exteriorly of said housing, the respective projections extending in opposite directions, respective identical link bars connecting said projections to the disc member, said link bars being parallel and at right angles to the disc member when said blades lie in the same plane whereby the blades are simultaneously rotated around their respective axes responsive to movement of the disc member along the propeller shaft, a yoke member having diametrically opposed arms positioned below said disc member and surrounding said propeller shaft, a hook portion on the outer end of each of said arms and embracing the periphery of said disc member, an upstanding bolt positioned on each side of and spaced from said propeller shaft and extending loosely through the adjacent one of said arms of said yoke member and having the lower end fixed to the fuselage, a head on the upper end of each of said bolts and engageable with the upper surface of the adjacent one of said arms of said yoke member when the latter member is moved toward said housing, a bent lever pivotally connected at its intermediate portion to the fuselage, a link bar connecting one end of the lever to said yoke member, and a control cable connected to the other end of said lever.

AMOS E. HAWKINS.

REFERENCES CITED

The following references are of record in the file of this patent:

UNITED STATES PATENTS

| Number | Name | Date |
| --- | --- | --- |
| 1,195,624 | Tanner | Aug. 22, 1916 |
| 1,835,372 | Bender et al. | Dec. 8, 1931 |
| 1,973,598 | Ballard et al. | Sept. 11, 1934 |
| 2,549,313 | Johnson | Apr. 17, 1951 |